Figure 1:
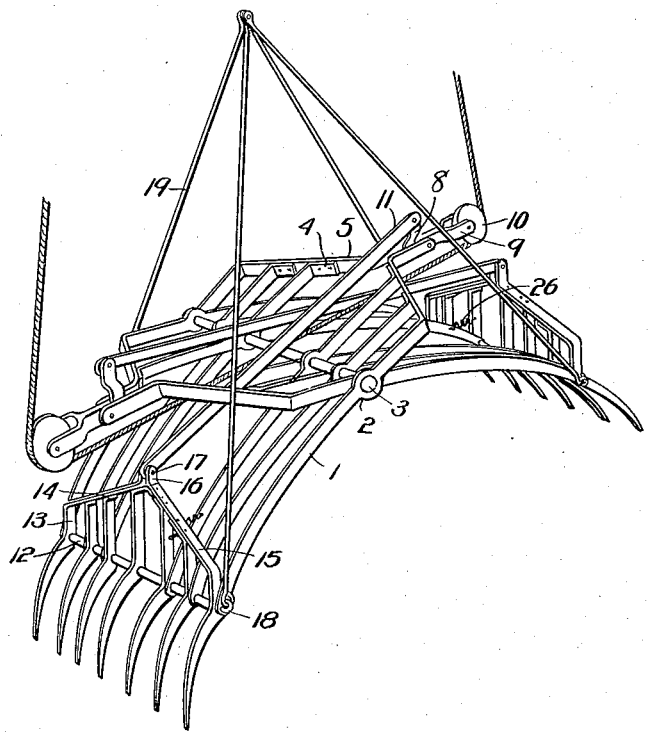

E. MURREY.
GRAB FORK.
APPLICATION. FILED APR. 5, 1915.

1,156,247.

Patented Oct. 12, 1915.
2 SHEETS—SHEET 1.

INVENTOR
Ed Murrey.
BY
Arthur C. Brown.
ATTORNEY

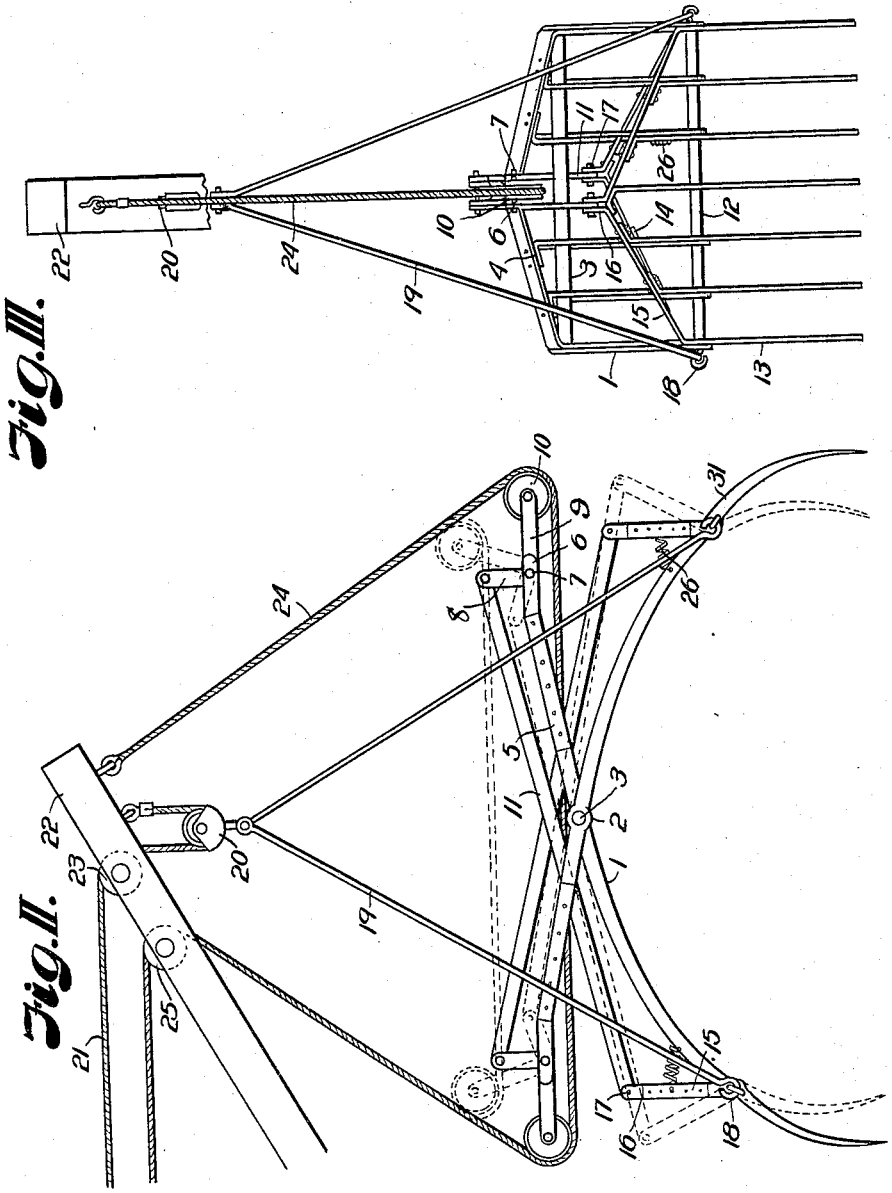

UNITED STATES PATENT OFFICE.

ED MURREY, OF UNIVERSITY PLACE, NEBRASKA, ASSIGNOR TO NOAH WHITE AND FRANK L. TURNER, BOTH OF LINCOLN, NEBRASKA.

GRAB-FORK.

1,156,247.

Specification of Letters Patent. Patented Oct. 12, 1915.

Application filed April 5, 1915. Serial No. 19,166.

*To all whom it may concern:*

Be it known that I, ED MURREY, a citizen of the United States, residing at University Place, in the county of Lancaster and State of Nebraska, have invented certain new and useful Improvements in Grab-Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to grab forks and more particularly to a device of that class for use in handling hay or the like; and is the same subject matter that is covered by my abandoned application Serial No. 661,974, filed November 23, 1911, the principal object of the invention being to provide a fork or grab having end teeth adapted for opening beyond the body of the fork to increase the opening, and for closing inwardly prior to the closing or lifting movement of the fork body to grip the material and hold same securely within the fork.

In accomplishing this object, I have provided the improved details of structure hereinafter described and illustrated in the accompanying drawings, wherein:—

Figure I is a perspective view of a grab fork constructed according to my invention, the fork being open ready for taking a load. Fig. II is an end view of the fork shown in open position, the teeth being shown in closed position in dotted lines. Fig. III is a side view of the fork.

Referring more in detail to the parts:—1 designates fork bars having enlargements 2, through which a shaft 3 is extended and upon which said bars are adapted to pivot. The enlargements 2 are arranged near the upper ends of the bars and said upper ends are turned laterally to provide the flanges 4.

Fixed to flanges 4 are metal straps 5 which are inclined toward a center position and have parallel ears 6 which are spaced apart, but are united by a pin 7.

Pivotally mounted on the pin 7 is a bell crank lever 8, the forward arm of which comprises a yoke 9 within which a pulley 10 is mounted, and the rear arm 8' being turned upwardly and pivotally connected with a rocker bar 11.

The lower ends of the bars 1 are united by a shaft 12 which extends across the fork and forms a pivoting base for the grab teeth.

Pivotally mounted on the shaft 12 are angled teeth 13; the lower ends of which are curved inwardly and pointed and the upper ends provided with laterally turned flanges 14.

Fixed to the flanges 14 are straps 15 having spaced parallel ears 16 united by a pin 17 upon which the lower end of the rocker bar 11 is pivotally mounted.

The fork bars and other parts mentioned are in duplicate and the entire device is adapted to open and close scissor-like when operated as presently described.

On the ends of the tooth pivot rods 12 are hooks 18 with which the hanger rods 19 are connected. Rods 19 are preferably brought together above the fork, and are connected with a pulley 20 over which a rope 21 is run; one end of the rope being anchored on a boom 22 and the other end run over a sheave wheel 23 on the boom and connected with a windlass or the like (not shown).

Anchored on the boom 22 is a second rope 24 which is run over the pulleys 10 on the bell crank levers 8 on the upper ends of the fork bodies and over a second pulley 25 on the boom and connected with a windlass not shown.

In using the device, presuming the parts to be assembled as described, the fork is suspended from the rods 19, which, being connected with the lower ends thereof, hold the fork bodies separated so that the lower mouth is open and in condition for lowering over a mass of material, the end teeth being spread to form an extended mouth opening. When the fork is lowered onto the material, the rope 24 is wound on its windlass so that the bell crank levers are rocked with the first movement of the rope, thereby pushing on the bars 11 and forcing the free ends of the teeth 13 into the material to press and grip the part of the mass located within the mouth of the fork.

A continued pull on the rope 24 will lift the upper ends of the fork bars and bring same together, tending to close the lower portions of the fork and clamp the material therein, so that as the fork is lifted it will hold the material gripped within the fork and lift it from the general mass.

It is apparent that when the fork is elevated, the boom may be moved to carry the load to a desired position.

While the bell crank lever and pulley will usually be of sufficient weight to rock the teeth 13 to open position, a spring 26 may be provided for insuring the opening movement.

Having thus described my invention, what I claim as new therein and desire to secure by Letters-Patent, is:—

1. A grab fork comprising crossed members, teeth pivotally mounted on the lower ends of said crossed members, rocker bars connected with said teeth, and means on the upper ends of said crossed members and engaging said rocker bars, whereby the crossed members are moved together and said teeth are rocked inwardly with the initial lifting movement.

2. A grab fork comprising crossed members having pivotal connection, and having bell crank levers mounted on their upper ends, teeth pivotally mounted on the lower ends of said crossed members and having lever ends, rocker bars connected with the lever ends and to said bell crank levers, and means engaging the rocker bars whereby the cross members are moved together and the teeth are rocked with the initial lifting movement of the fork.

3. A grab fork comprising crossed members having pivotal connection, teeth pivotally mounted on the lower ends of said crossed members, bell crank levers pivotally mounted on the upper ends of said members, pulleys carried by said bell crank levers, a rope run over said pulleys and adapted for lifting the fork, and rocker bars connecting the bell crank levers and teeth whereby the latter are moved toward each other with the initial tightening of the rope.

4. A grab fork comprising a double series of crossed bars having pivotal connection, rods extending through the outer ends of each of said series of bars, teeth pivotally mounted on said rods and having levers, end straps connecting the upper ends of the bars in each series and having ears extending parallel in a central position, hanger rods connected with said first named rods and provided with a pulley, a rope run over said pulley and adapted for supporting the fork in open position, bell crank levers pivoted between the ears of said straps, straps connecting the lever ends of said teeth and having ears at central positions, rocker bars connecting the ears of said bell crank levers and the strap ears at opposite sides of the fork, pulleys mounted on the opposite ends of said bell crank levers, and a rope run over said pulleys and adapted for rocking the teeth and then lifting the fork in closed position when the rope is tightened.

In testimony whereof I affix my signature in presence of two witnesses.

ED MURREY.

Witnesses:
JOHN CARR,
I. V. REASONER.

Copies of this patent may be obtained for five cents each, by addressing the "Commissioner of Patents, Washington, D. C."